US010788875B2

(12) United States Patent
Mattos et al.

(10) Patent No.: US 10,788,875 B2
(45) Date of Patent: Sep. 29, 2020

(54) USB POWER CONTROL ANALOG SUBSYSTEM ARCHITECTURE

(71) Applicant: Cypress Semiconductor Corporation, San Jose, CA (US)

(72) Inventors: Derwin W. Mattos, San Mateo, CA (US); Anup Nayak, Fremont, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 16/277,124

(22) Filed: Feb. 15, 2019

(65) Prior Publication Data

US 2019/0294226 A1 Sep. 26, 2019

Related U.S. Application Data

(63) Continuation of application No. 15/848,412, filed on Dec. 20, 2017, now Pat. No. 10,228,742.

(Continued)

(51) Int. Cl.
  *G06F 1/26* (2006.01)
  *G05F 3/16* (2006.01)
  (Continued)

(52) U.S. Cl.
  CPC ............... *G06F 1/266* (2013.01); *G05F 3/16* (2013.01); *G06F 13/24* (2013.01); *G06F 13/385* (2013.01);
  (Continued)

(58) Field of Classification Search
  CPC ........ G06F 13/24; G06F 1/266; G06F 13/385; G06F 13/4282; G05F 3/16
  See application file for complete search history.

(56) References Cited

U.S. PATENT DOCUMENTS 7,528,574 B1  5/2009 Adkins et al.
8,058,910 B1 * 11/2011 Wright ................... G06F 1/24
                                             327/143

(Continued)

OTHER PUBLICATIONS

"USB Power Delivery 4-Switch Buck Boost Controller," On Semiconductor [online], Semiconductor Components Industries LLC, published on Jan. 2017 [retrieved on Oct. 9, 2017] retrieved from internet; 18 pages.

(Continued)

*Primary Examiner* — Tim T Vo
*Assistant Examiner* — Phong H Dang

(57) ABSTRACT

A device and method that include a power control analog subsystem of a universal serial bus (USB) compatible power supply device is disclosed. The power control analog subsystem includes a programmable reference generator to generate first reference voltages. The power control analog subsystem also includes multiplexers, where each of a plurality of multiplexers are coupled to a first terminal and a second terminal of a producer field-effect transistor (FET) to receive a first voltage (Vbus_in) and a second voltage (Vbus_c) and to output second reference voltages. The power control analog subsystem further includes comparators, wherein each of the comparators is coupled to receive a corresponding reference voltage of the first reference voltages from the programmable reference generator and to receive a corresponding selected voltage from a corresponding multiplexer of the multiplexers. Each of the comparators is configured to output a corresponding system interrupt based on a corresponding voltage condition.

22 Claims, 12 Drawing Sheets

Related U.S. Application Data

(60) Provisional application No. 62/508,001, filed on May 18, 2017.

(51) Int. Cl.
*G06F 13/42* (2006.01)
*G06F 13/24* (2006.01)
*G06F 13/38* (2006.01)
*H02M 3/335* (2006.01)

(52) U.S. Cl.
CPC .. *G06F 13/4282* (2013.01); *G06F 2213/0042* (2013.01); *G06F 2213/2404* (2013.01); *H02M 3/33576* (2013.01); *H02M 3/33592* (2013.01)

(56) References Cited

U.S. PATENT DOCUMENTS

| | | | |
|---|---|---|---|
| 8,427,121 B2 | 4/2013 | Notman | |
| 8,892,914 B2 | 11/2014 | Huynh | |
| 9,343,982 B2 | 5/2016 | Yang | |
| 9,543,844 B2 | 1/2017 | Gong et al. | |
| 9,684,350 B2 | 6/2017 | Low | |
| 9,710,406 B2 | 7/2017 | Pethe et al. | |
| 9,748,788 B2 | 8/2017 | Sporck et al. | |
| 10,228,742 B2* | 3/2019 | Mattos | G06F 1/266 |
| 2001/0007134 A1* | 7/2001 | Odaohhara | G06F 1/263 |
| | | | 713/300 |
| 2003/0095368 A1 | 5/2003 | Daniels et al. | |
| 2004/0095114 A1 | 5/2004 | Kemahan | |
| 2006/0033474 A1 | 2/2006 | Shum | |
| 2009/0167093 A1* | 7/2009 | Nguyen | G06F 1/28 |
| | | | 307/80 |
| 2009/0198841 A1 | 8/2009 | Yoshida et al. | |
| 2009/0206794 A1 | 8/2009 | Ferguson | |
| 2009/0295339 A1 | 12/2009 | Wong | |
| 2009/0322302 A1 | 12/2009 | Fukushi | |
| 2010/0073090 A1* | 3/2010 | Mattos | H03F 1/52 |
| | | | 330/254 |
| 2011/0016334 A1* | 1/2011 | Tom | G06F 1/266 |
| | | | 713/300 |
| 2012/0223682 A1 | 9/2012 | Hussain et al. | |
| 2013/0043828 A1* | 2/2013 | Gurlahosur | H02J 7/0081 |
| | | | 320/107 |
| 2013/0088203 A1 | 4/2013 | Solie | |
| 2013/0113415 A1* | 5/2013 | Chen | B65D 19/385 |
| | | | 320/107 |
| 2013/0286525 A1 | 10/2013 | Kanamori et al. | |
| 2014/0092505 A1 | 4/2014 | Norris et al. | |
| 2014/0184173 A1 | 7/2014 | Szepesi | |
| 2014/0195065 A1* | 7/2014 | Yang | H02M 3/33523 |
| | | | 700/298 |
| 2014/0282349 A1 | 9/2014 | Feng et al. | |
| 2014/0313794 A1 | 10/2014 | Ono et al. | |
| 2015/0028790 A1 | 1/2015 | Qu et al. | |
| 2015/0277461 A1 | 10/2015 | Anderson et al. | |
| 2015/0357849 A1 | 12/2015 | Wong | |
| 2016/0124478 A1* | 5/2016 | Beeston | G06F 1/28 |
| | | | 713/300 |
| 2016/0179155 A1 | 6/2016 | Lester | |
| 2016/0190794 A1* | 6/2016 | Forghani-Zadeh | H02H 7/20 |
| | | | 361/86 |
| 2016/0342492 A1* | 11/2016 | Chen | G06F 13/385 |
| 2016/0349814 A1 | 12/2016 | Carpenter, Jr. et al. | |
| 2016/0372936 A1 | 12/2016 | Agarwal et al. | |
| 2017/0192446 A1 | 7/2017 | Su et al. | |
| 2017/0331270 A1 | 11/2017 | Mattos et al. | |

OTHER PUBLICATIONS

Chen et al. "A Dynamic Bootstrap Voltage Technique for a High-Efficiency Buck Converter in a Universal Serial Bus Power Delivery Device," IEEE Transactions on Power Electronics, vol. 31, No. 4, Apr. 2016, 14 pages.

International Search Report for International Application No. PCT/US18/19991 dated Mar. 23, 2018; 3 pages.

International Search Report for International Application No. PCT/US2018/030947 dated Jul. 23, 2018, 3 pages.

USPTO Advisory Action for U.S. Appl. No. 15/848,412 dated Oct. 5, 2018; 3 pages.

USPTO Applicant Initiated Interview Summary for U.S. Appl. No. 15/848,412 dated Sep. 27, 2018; 3 pages.

USPTO Applicant-Initiated Interview Summary for U.S. Appl. No. 15/848,412 dated May 3, 2018; 3 pages.

USPTO Final Rejection for U.S. Appl. No. 15/848,412 dated Aug. 27, 2018; 24 pages.

USPTO Non-Final Rejection for U.S. Appl. No. 15/848,412 dated Mar. 7, 2018; 22 pages.

USPTO Non-Final Rejection for U.S. Appl. No. 15/924,689 dated Aug. 7, 2018; 10 pages.

USPTO Notice of Allowance for U.S. Appl. No. 15/848,412 dated Nov. 29, 2018; 8 pages.

USPTO Notice of Allowance for U.S. Appl. No. 15/924,689 dated Dec. 10, 2018; 7 pages.

Written Opinion of the International Searching Authority for International Application No. PCT/US18/19991 dated Mar. 23, 2018; 12 pages.

Written Opinion of the International Searching Authority for International Application No. PCT/US2018/030947 dated Jul. 23, 2018, 5 pages.

Japanese Office Action for Japanese patent application No. 2019-553004 dated Jul. 7, 2020, 6 pages.

* cited by examiner

USB POWER CONTROL ANALOG SUBSYSTEM ARCHITECTURE

RELATED APPLICATIONS

This application is a continuation of U.S. patent application Ser. No. 15/848,412, filed on Dec. 20, 2017, which claims priority to U.S. Provisional Application No. 62/508,001, filed on May 18, 2017, all of which are incorporated by reference herein in their entirety.

TECHNICAL FIELD

The disclosure relates to the field of electronic circuits, in particular to power control analog subsystem architecture.

BACKGROUND

Electronic circuits may include individual electronic components, such as resistors, transistors, capacitors, inductors, and diodes, among others, connected by conductive wires or traces through which electric current can flow. Electronic circuits may be constructed using discrete components, or more commonly integrated in an integrated circuit where the components and interconnections are formed on a common substrate, such as silicon.

BRIEF DESCRIPTION OF THE DRAWINGS

The disclosure is illustrated by way of example, and not of limitation, in the figures of the accompanying drawings.

DETAILED DESCRIPTION

Figure 1:
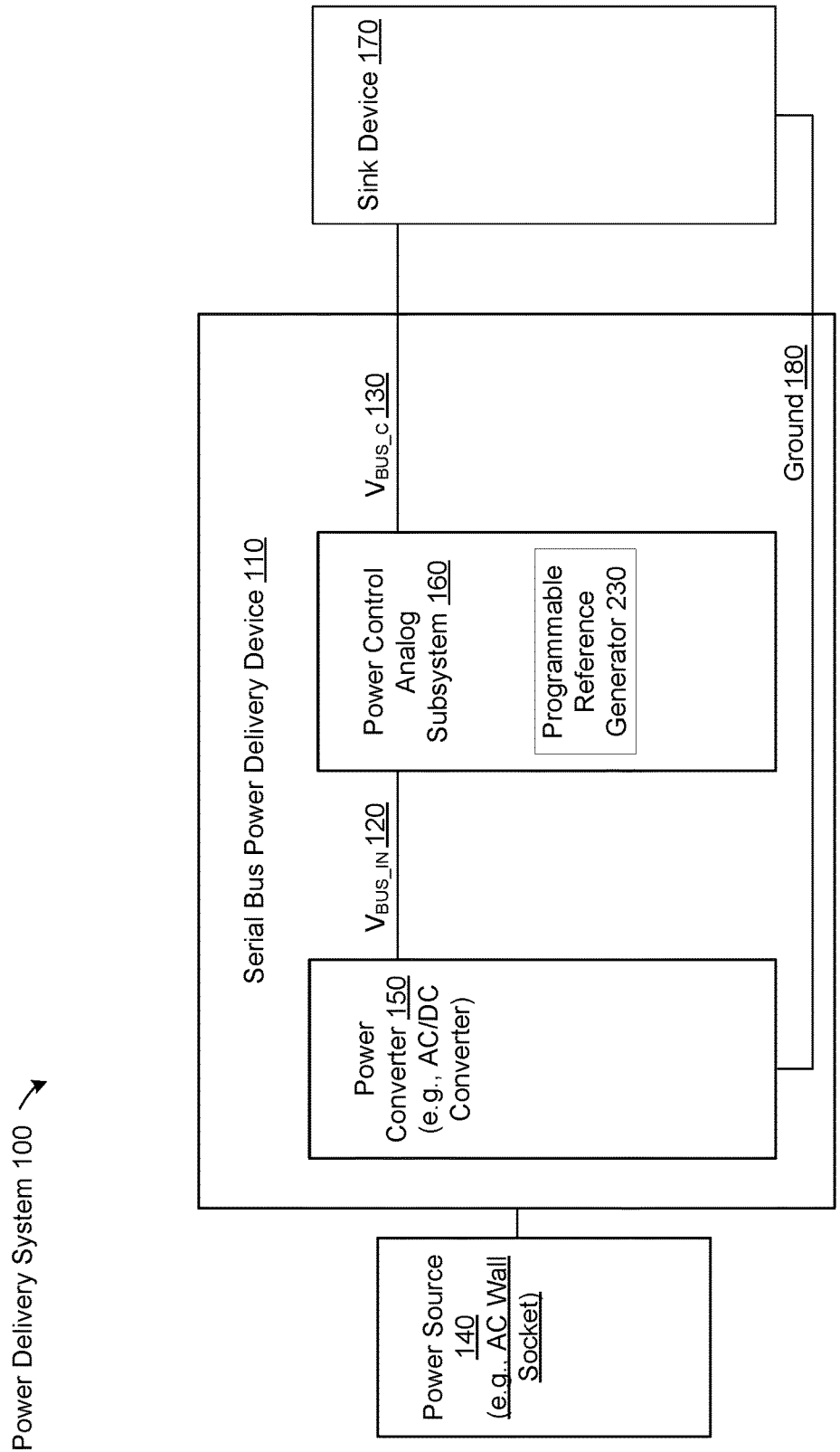
FIG. 1 is a block diagram of a power delivery system, according to some embodiments.

A programmable circuit may be an electronic circuit, such as an integrated circuit (IC) that has multiple components that are reconfigurable to perform various operations or functions. Unlike fixed function circuits, programmable circuits may be programmed (e.g., configured or reconfigured) during operation (e.g., field-programmable, dynamic) or prior to use to execute some functions and not execute other functions. In addition, a programmable circuit may be configured or reconfigured during operation based on the programming of the programmable circuit (e.g., run-time configurable). Programmable circuits may be reprogrammed multiple times to execute different operations and functions.

Application demand has increased the desire for programmable circuits with increased flexibility to support diverse applications. Rather than support some operations with off-chip components, designers are tasked with bringing functionality to programmable circuits to improve performance, cost, meet customer demands, and repurpose functional blocks to perform multiple functions. For example, programmable circuits may require multiple, adjustable sense and interrupt functions (e.g., over-voltage (OV), under-voltage (UV), over-current, and short-circuit detection). Various functions may be designed as stand-alone blocks. Each stand-alone block may require its own reference generator and programmable settings. For example, a programmable circuit may have two circuits that each has its own comparators and reference generators (e.g., current sense amplifier (CSA) and under-voltage over-voltage (UVOV) detection circuit). Traditionally, a reference generator does not provide reference signals for multiple, simultaneous functions (e.g., over current protection (OCP), short circuit protection (SCP), power factor correction (PFC), and synchronous rectification (SR)). Traditionally, components cannot be time-multiplexed in a programmable circuit (e.g., comparator for OV cannot be used for PFC). Using a programmable integrated circuit (IC) to implement various analog functions may not apply to some applications. For example, programmable integrated circuit may not apply to universal serial bus-power delivery (USB-PD) Type-C (USB Type-C™, USB-C™) applications.

The embodiments described herein may address the above-mentioned and other challenges by providing, a serial bus-compatible power supply device, such as a serial bus power delivery (SBPD) device with a power control analog subsystem having a programmable reference generator, multiplexers, and comparators that are used to provide multiple interrupt functions. The SBPD (also referred to as a "source device" herein) may be a USB compatible power supply device.

In some embodiments, a SBPD device may include a register set to store register values to program reference voltages. The SBPD device may also include a central processing unit (CPU), coupled to the register set, to store the register values in the register set. The CPU may include inputs to receive system interrupts from the SBPD based on the sensing and monitoring done by the SBPD device. The SBPD device may also include a power control analog system coupled to the CPU and the register set. The power control analog system may include a programmable reference generator to generate corresponding reference voltages in response to the corresponding register values. The power control analog system may include multiplexers, coupled to a first voltage and a second voltage, to output corresponding selected voltages. The power control analog system may include comparators, coupled to receive a corresponding reference voltage from the programmable reference generator and to receive a corresponding selected voltage from a corresponding multiplexer. Each comparator may output a corresponding system interrupt to the CPU based on a corresponding voltage condition. In other embodiments, the outputs of the comparators can be control signals to control other circuitry, such as a discharge circuit as described herein.

FIG. 1 is a block diagram of a power delivery system 100 (also referred to as "system" herein). System 100 includes a serial bus-compatible power supply device 110. An example of a serial bus-compatible power supply device 110 may include a serial bus power delivery (SBPD) device 110 or a USB-compatible power supply device. It may be noted that serial bus power delivery device is referred to SBPD device, herein, for an example. In some embodiments, SBPD device 110 is USB-PD device that is compatible with the USB-PD standard or more generally with the USB standard. For example, SBPD device 110 may be used to provide an output voltage (e.g., Vbus_c 130, power supply voltage) based on an input voltage (e.g., Vbus_in 120, power supply voltage). The SBPD device 110 may be used to provide dynamic programmability of Vbus_c 130 in a range of voltages (e.g., 3 volts (V) to 22 V) within a defined tolerance (e.g., 5% tolerance) and in small increments (e.g., 20 millivolts (mV)). Dynamic programmability may refer to the ability to program different output voltages while a device is powered. In some embodiments, the current supplied by SBPD device 110 may also be configurable and programmable and support a range of supplied current, such as from 500 milliamperes (mA) to 5 amperes (A). It may be noted that voltage bus may refer to the physical connection (e.g., bus) on which Vbus_c 130 is conducted.

The SBPD device 110 may include a power converter 150 (e.g., an AC/DC converter) and a power control analog subsystem 160 (e.g., a USB-PD controller). The power control analog subsystem 160 may include a programmable reference generator 230. The programmable reference generator 230 may generate multiple reference voltages for different functions (e.g., OV, UV, OCP, SCP, PFC, SR, etc.). In embodiments, SBPD device 110 is connected to power source 140. In some embodiments, the power source 140 may be a wall socket power source that provides alternating current (AC) power. In other embodiments, power source 140 may be a different power source, such as a battery, and may provide direct current (DC) power to SBPD device 110. Power converter 150 may convert the power received from power source 140 (e.g., convert power received to Vbus_in 120). For example, power converter 150 may be an AC/DC converter and convert AC power from power source 140 to DC power. In some embodiments, power converter 150 is a flyback converter, such as an optocoupler-based flyback converter, that provides galvanic isolation between the input (e.g., primary side) and the output (e.g., secondary side).

In some embodiments, SBPD device 110 provides Vbus_c 130 to a sink device 170 (e.g., via communication channel (CC) specifying a particular output voltage, and possibly an output current). SBPD device 110 may also provide access to ground potential (e.g., ground 180) to the sink device 170. In some embodiments, the providing of the Vbus_c 130 is compatible with the USB-PD standard. Power control analog subsystem 160 may receive Vbus_in 120 from power converter 150. The power control analog subsystem 160 may output Vbus_in 130. In some embodiments, power control analog subsystem 160 is a USB Type-C™ controller compatible with the USB Type-C™ standard. As will be further described in the following figures, power control analog subsystem 160 may provide system interrupts responsive to the Vbus_in 120 and the Vbus_c 130.

In some embodiments, any of the components of SBPD device 110 may be part of an IC or alternatively any of the components of SBPD device 110 may be implemented in its own IC. For example, power converter 150 and power control analog subsystem 160 may each be discrete ICs with separate packaging and pin configurations.

In some embodiments, the SBPD device 110 may provide a complete USB Type-C™ and USB-Power Delivery port control solution for notebooks, dongles, monitors, docking stations, power adapters, vehicle chargers, power banks, mobile adaptors, and the like.

Figure 2:
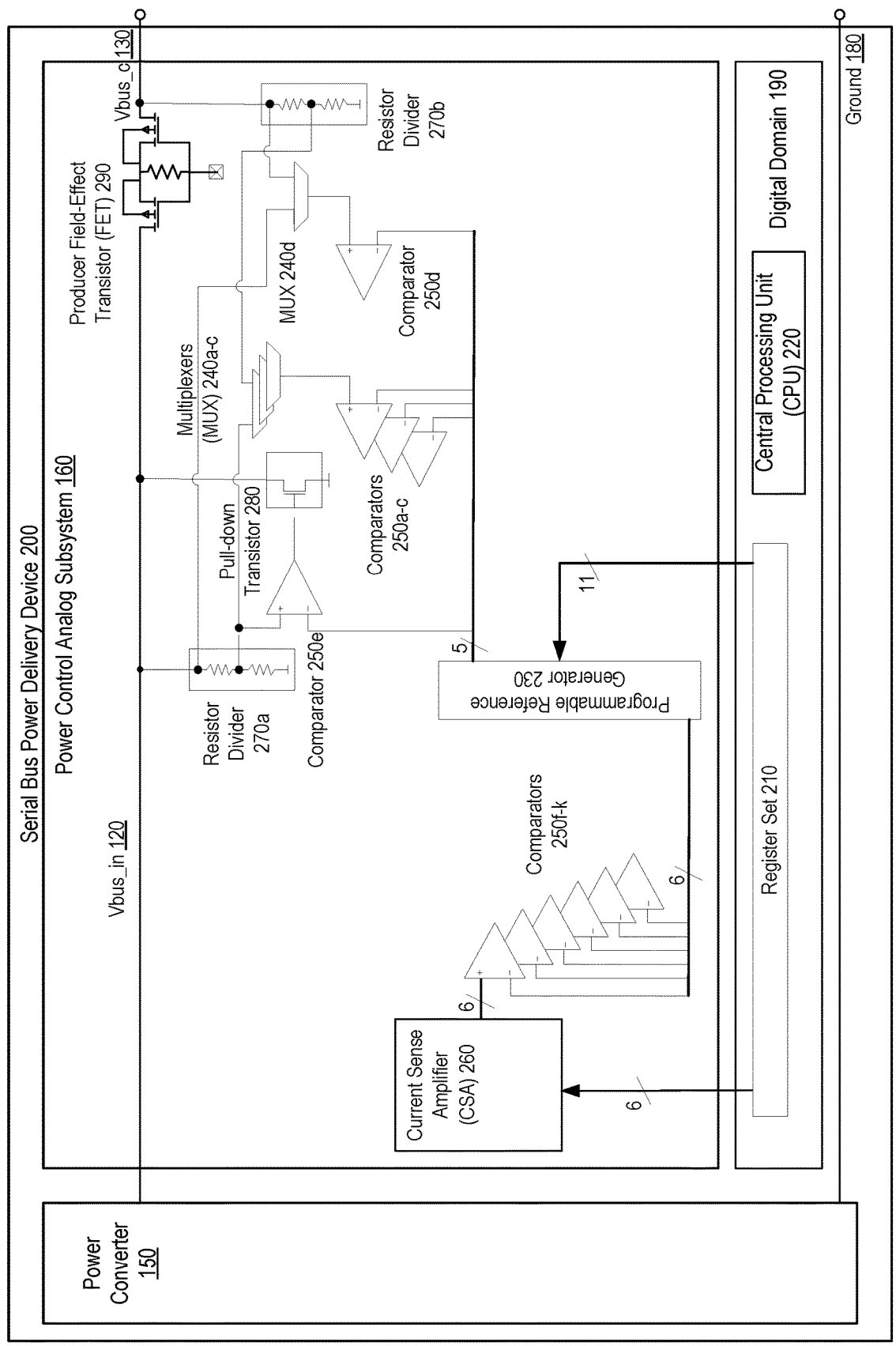
FIG. 2 is a circuit diagram illustrating a serial bus power delivery device, according to some embodiments.

FIG. 2 is a circuit diagram illustrating a serial bus power delivery device 200, according to some embodiments. SBPD device 200 may be similar to SBPD device 110 as described with respect to FIG. 1. For the sake of convenience and clarity, numbers of components used in FIG. 1 are used in the present Figure. SBPD device 200 device includes power converter 150, power control analog subsystem 160, Vbus_in 120, Vbus_c 130, and ground 180. In other embodiments, SBPD device 200 may include the same, more, or fewer components. Power control analog subsystem 160 is illustrated as a discrete device (e.g., IC in its own package and with ouput pins) for purposes of illustration, rather than limitation.

In some embodiments, the SBPD device 200 may include power converter 150, power control analog subsystem 160, and a digital domain 190. The digital domain 190 may include a register set 210 and a central processing unit (CPU) 220. The register set 210 may store register values to program reference voltages. The CPU 220 may be coupled to the register set 210. The CPU 220 may store the register values in the register set 210. The CPU 220 may include inputs, wherein each input is to receive a corresponding system interrupt.

The power control analog subsystem 160 may be coupled to the register set 210 and the CPU 220. The power control analog subsystem 160 may include a programmable reference generator 230, multiplexers 240, comparators 250, current sense amplifier (CSA) 260, resistor dividers 270, and a pull-down transistor 280. In some embodiments, the power control analog subsystem 160 includes a producer field-effect transistor (FET) 290. In some embodiments, the producer FET 290 is external to the power control analog subsystem 160.

The programmable reference generator 230 may generate reference voltages in response to the register values. For example, the programmable reference generator 230 may generate a first reference voltage in response to the first register value, a second reference voltage in response to the second register value, etc. The programmable reference generator 230 may be a common voltage reference signal generator (i.e., may be used to provide multiple types of system interrupts). Each reference voltage may be indicative of a corresponding programmable threshold for a corresponding operation (e.g., first reference voltage is indicative of a first programmable threshold for a first operation, second reference voltage is indicative of a second programmable threshold for a second operation that is different from the first operation, etc.).

Resistor divider 270a may sense a voltage level on a first Vbus power supply (e.g., first voltage, Vbus_in 120). Resistor divider 270b may sense a voltage level on a second Vbus power supply (e.g., second voltage, Vbus_c 130). A first resistor divider 270a may output the Vbus_in 120 and a second resistor divider 120b may output the Vbus_c 130. Each of the multiplexers 240a-d may be coupled to receive a corresponding first value of the Vbus_in 120 from the first resistor divider 270b and a corresponding second value of the Vbus_c 130 from the second resistor divider 270b.

The multiplexers 240 may be analog multiplexers. The multiplexers 240 (e.g., multiplexers 240a-d) may be coupled to a first voltage (e.g., Vbus_in 120, an input voltage) and a second voltage (e.g., Vbus_c 130, an output voltage). Each multiplexer 240 may have a first input coupled to a resistor divider 270a that is coupled to Vbus_in 120, a second input coupled to a resistor divider 270b that is coupled to Vbus_c 130, and an output coupled to a comparator 250. Multiplexers 240a-d may be coupled to a first terminal and a second terminal of the producer FET to receive a first voltage (Vbus_in 120) and a second voltage (Vbus_c 130) and to output a second plurality of reference voltages.

Each of the comparators 250 (comparators 250a-k) may be coupled to receive a corresponding reference voltage from the programmable reference generator 230. Each of the comparators 250 a-d may be coupled to receive a corresponding selected voltage from a corresponding multiplexer of multiplexers 240a-d. Comparators 250a-d may be configured to output a corresponding system interrupt to the CPU 220 based on a corresponding voltage condition. Comparator 250e may be coupled to receive a corresponding reference voltage from the programmable reference generator 230 and to receive a first voltage from the resistor divider 270a that is coupled to Vbus_in 120. Comparators 250f-k may be coupled to receive a corresponding reference voltage from the programmable reference generator 230 and to receive a corresponding output voltage from the CSA 260. As will be further described in the following figures, comparators 250a-k may provide operations or functions (e.g., interrupt functions, etc.).

In some embodiments, the programmable reference generator 230 is used to provide an operation or function via each of the comparators 250a-k. In some embodiments, the programmable reference generator 230 is used to provide more operations or functions than the number of comparators 250a-k (e.g., via more components than the comparators 250a-k). In some embodiments, the programmable reference generator 230 is used to provide fewer operations or functions (e.g., UV, OV, and OCP) than the number of comparators 250a-k. The consolidated reference source (i.e., programmable reference generator 230) may minimize device area and may provide for flexibility (e.g., reduce need for multiple circuits with different characteristics). An array of comparators 250 may enable simultaneous monitoring of voltage and current in the SBPD device 200 (e.g., the array of comparators may enable simultaneous monitoring of voltage and current in a USB-PD device). An array of analog MUXes may enable the SBPD device 200 to be used in various USB-PD applications. The power control analog subsystem 160 may include two independent input reference voltage signals (e.g., Vbus_in 120 and Vbus_c 130) and a CSA 260.

In some embodiments, a single reference voltage is routed to various functional blocks. Each block may have a reference generator and programming options. In some embodiments, all analog signals may be converted to digital and all filtering and comparator functions may be performed in the digital realm (e.g., a programmable reference generator 230 may not be needed). In some implementations, all input signals may be connected to any comparator 250 (e.g., to create a fully programmable cross switch). In some embodiments, the SBPD device 200 may be applied to any power adapter system (e.g., not just USB-PD power adapters).

Figure 3:
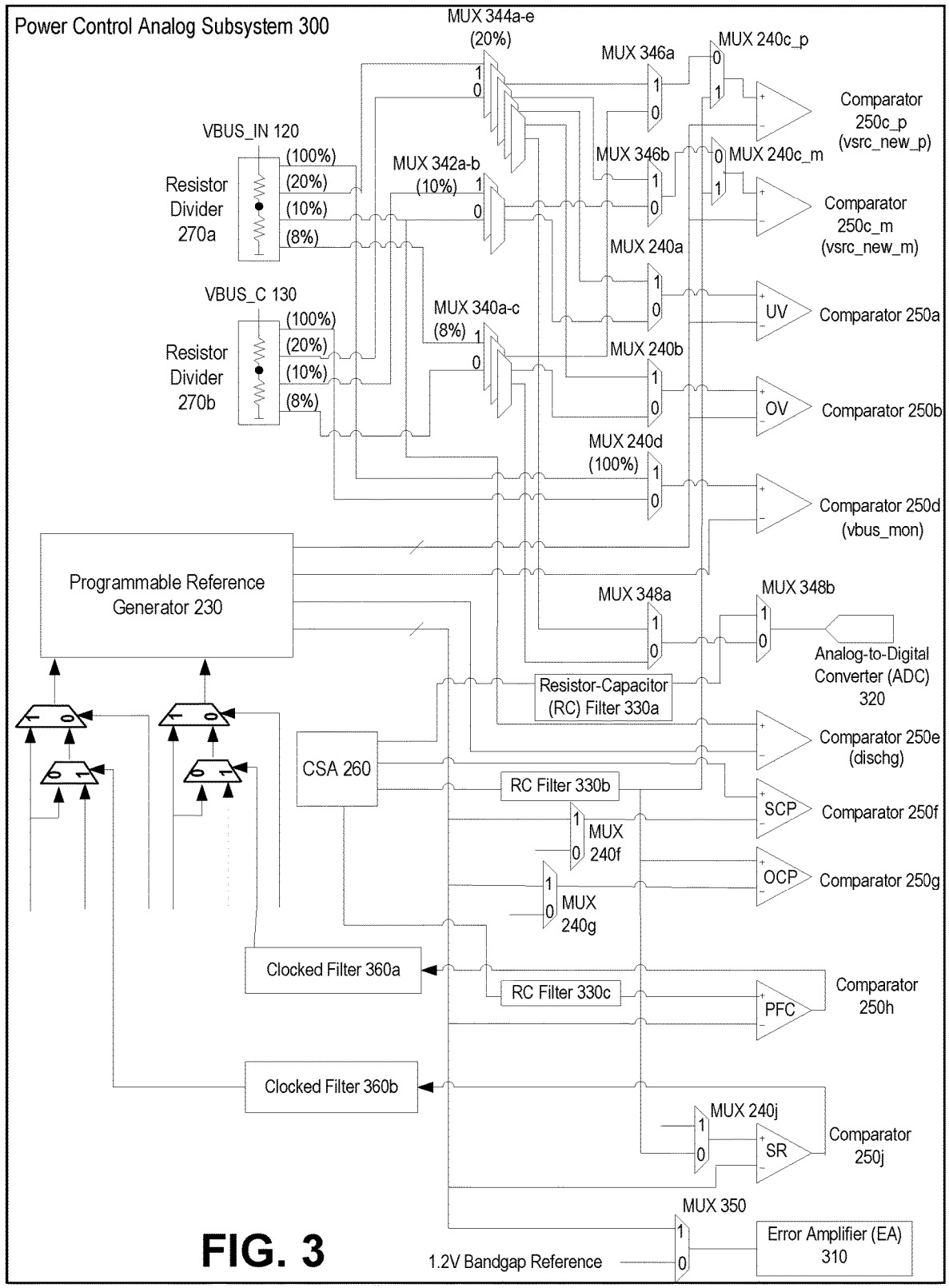
FIG. 3 is a circuit diagram illustrating a power control analog subsystem, according to some embodiments.

FIG. 3 is a circuit diagram illustrating a power control analog subsystem 300, according to some embodiments. Power control analog subsystem 300 may include some similar components as power control analog subsystem 160 as described with respect to FIGS. 1-2. For the sake of convenience and clarity, some components used in FIGS. 1-2 are used in the present Figure.

Conceptually, power control analog subsystem 300 works similarly to power control analog subsystem 160 of FIGS. 1-2. Multiple connection paths may enable the power control analog subsystem 300 to adjust to multiple applications. Various voltage levels may be supported at inputs using different MUX cell types (e.g., 20V, 5V).

The power control analog subsystem 300 may include a programmable reference generator 230, MUXes (e.g., MUX 240a-k, MUX 340a-c, MUX 342a-b, MUX 344a-e, MUX 346a-b, MUX 348a-b, MUX 350, etc.), comparators 250a-k, resistor dividers 270a-b, error amplifier (EA) 310, analog-to-digital converter (ADC) 320, resistor-capacitor (RC) filters 330a-c, and logic or clocked filters 360a-b. The clocked filters 360a-b may pass pulses that meet a threshold length (e.g., pass only pulses that are sufficiently long enough). The clocked filters 360a-b may act like RC filters, but occupy less area than an RC filter. The clocked filters 360a-b may use a clock to implement internal counters.

The power control analog subsystem 300 may be coupled to comparators 250a-k and error amplifier (EA) 310.

Resistor divider 270a may receive an input of Vbus_in 120 and may output different voltages (e.g., 100% percent of Vbus_in 120, 20% percent of Vbus_in 120, 10% percent of Vbus_in 120, and 8% percent of Vbus_in 120). Resistor divider 270b may receive an input of Vbus_c 130 and may output different voltages (e.g., 100% percent of Vbus_c 130, 20% percent of Vbus_c 130, 10% percent of Vbus_c 130, and 8% percent of Vbus_c 130).

MUX 340a-c may receive a first voltage (e.g., 8% percent of Vbus_in 120) from resistor divider 270a and a second voltage (e.g., 8% percent of Vbus_c 130) from resistor divider 270b.

MUX 342a-b may receive a first voltage (e.g., 10% percent of Vbus_in 120) from resistor divider 270a and a second voltage (e.g., 10% percent of Vbus_c 130) from resistor divider 270b.

MUX 344a-e may receive a first voltage (e.g., 20% percent of Vbus_in 120) from resistor divider 270a and a second voltage (e.g., 20% percent of Vbus_c 130) from resistor divider 270b.

MUX 346a may receive a selected voltage from MUX 344a (e.g., 20% Vbus_in 120 or 20% Vbus_c 130) and a selected voltage from MUX 340a (e.g., 8% Vbus_c 130 or 8% Vbus_c 130). MUX 346b may receive a selected voltage from MUX 344b (e.g., 20% Vbus_in 120) and an output voltage from MUX 342a (e.g., 10% Vbus_in 120).

MUX 348a may receive a selected voltage from MUX 344e (e.g., 20% Vbus_in 120 or 20% Vbus_c 130) and a selected voltage from MUX 340c (e.g., 8% Vbus_c 120 or 8% Vbus_c 130). MUX 348b may receive an output voltage from CSA 260 (e.g., via RC filter 330a) and from MUX 348a. ADC 320 may receive an output voltage from MUX 348b.

MUX 350 may receive a reference voltage from the programmable reference generator 230 and a 1.2V bandgap reference voltage. EA 310 may receive an output voltage from the MUX 350.

Over-voltage (OV) and under-voltage (UV) detection may be provided by comparators 250a-b. OV and UV detection may be at voltages ranging from 2V to 25V on either Vbus pin (i.e., Vbus_in or Vbus_c).

Comparator 250a may be coupled to receive a first reference voltage from the programmable reference generator 230 and to receive a first selected voltage from MUX 240a. MUX 240a may receive a selected voltage from MUX 344c (e.g., that receives 20% Vbus_in 120 from resistor divider 270a and 20% Vbus_c 130 from resistor divider 270b) and from MUX 342b (e.g., that receives 10% Vbus_in 120 from resistor divider 270a and 10% Vbus_c 130 from resistor divider 270b). Comparator 250a may output a UV system interrupt based on determining that one or more of the Vbus_in 120 or the Vbus_c 130 meets a first voltage condition (e.g., is less than a first minimum threshold voltage).

Comparator 250b may be coupled to receive a second reference voltage from the programmable reference generator and to receive a second selected voltage from MUX 240b. MUX 240b may receive a selected voltage from 344d (e.g., that receives 20% Vbus_in 120 from resistor divider 270a and that receives 20% Vbus_c 130 from resistor divider 270b) and a selected voltage from MUX 340b (e.g., that receives 8% Vbus_in 120 from resistor divider 270a and that receives 8% Vbus_c 130 from resistor divider 270b). Comparator 250b may output an OV system interrupt based on determining that one or more of the Vbus_in 120 or the Vbus_c 130 meets a second voltage condition (e.g., is greater than a second maximum threshold voltage).

Monitoring of Vbus_c 130 may be provided by comparator 250d. Vbus_c monitor sensing may be at 0.8V from either Vbus pin at Type-C attach (determine whether Vbus_in 120 or Vbus_c 130 is greater than 0.8V).

Comparator 250d may be coupled to receive a third reference voltage from the programmable reference generator and to receive a third selected voltage from MUX 240d. MUX 240d may receive the first Vbus_in 120 (e.g., at 100%) and the Vbus_c 130 (e.g., at 100%). Comparator 250d may be configured to output a Vbus monitor system interrupt based on determining that one or more of the first voltage or the second voltage meets a third voltage condition (e.g., is greater than a third threshold voltage (e.g., 0.8V)).

Programmable Vbus_in discharge control may be provided by comparator 250e and pull-down transistor 280 (see FIG. 2). Comparator 250e may stop pull-down when a target voltage is reached.

Comparator 250e may be coupled to receive a fourth reference voltage from the programmable reference generator 230 and to receive the Vbus_in 130 (e.g., at 10% Vbus_in 130) from the first resistor divider. Comparator 250e may be configured to discharge the Vbus_in 120 based on determining that the Vbus_in 120 meets a fourth voltage condition (e.g., based on determining that the SBPD device 110 is shutdown, based on determining that a target voltage is met).

Short-circuit protection (SCP) and over-current protection (OCP) may be provided via comparators 250f and 250g (e.g., providing of SCP and OCP, over-current detection and short-circuit detection). OCP and SCP may be provided using the same or independent references sources (e.g., bandgap (BG) reference, deep sleep (DS) reference) at various, user defined levels.

Comparator 250f may be coupled to receive a fifth reference voltage from the programmable reference generator 230 and to receive a fifth output voltage from the CSA 260. Comparator 250f may be configured to output a SCP system interrupt based on determining that the fifth output voltage meets a fifth voltage condition (e.g., is greater than a fifth threshold voltage).

Comparator 250g may be coupled to receive a sixth reference voltage of from the programmable reference generator 230 and to receive a sixth output voltage from the CSA 260. Comparator 250g may be configured to output an OCP system interrupt based on determining that the sixth output voltage meets a sixth voltage condition (e.g., is greater than a sixth threshold voltage).

Power factor correction (PFC) and synchronous rectification (SR) may be provided by comparators 250h-k. Simultaneous PFC and SR may be provided at various, user-defined levels.

Comparator 250h may be coupled to receive a seventh reference voltage from the programmable reference generator 230 and to receive a seventh output voltage from CSA 260. Comparator 250h may be configured to output a PFC system interrupt (e.g., to enable PFC) based on determining that a seventh voltage condition is met. Clocked filter 360a may receive an output from comparator 250h in response to the corresponding threshold being met.

Comparator 250i may be coupled to receive an eighth reference voltage from the programmable reference generator 230 and to receive an eighth output voltage from CSA 260. Comparator 250i may be configured to output a PFC system interrupt (e.g., to disable PFC) based on determining an eighth voltage condition is met. A corresponding clocked filter may receive output from comparator 250i in response to the eighth voltage condition being met.

Comparator 250j may be coupled to receive a ninth reference voltage from the programmable reference generator 230 and to receive a ninth output voltage from a CSA 260. Comparator 250j may be configured to output a SR system interrupt (e.g., to enable SR) based on determining that a ninth voltage condition is met. Clocked filter 360b may receive an output from comparator 250j in response to a ninth voltage condition being met.

Comparator 250k may be coupled to receive a tenth reference voltage from the programmable reference generator 230 and to receive a tenth output voltage from a CSA 260. Comparator 250k may be configured to output a SR system interrupt (e.g., to disable SR) based on determining that a tenth voltage condition is met. A corresponding clocked filter may receive an output from comparator 250k in response to a tenth voltage condition being met.

Monitoring of Vbus_in 120 and Vbus_c 130 voltages may be provided by ADC 320. ADC 320 may be coupled to receive an output from MUX 348b. MUX 348b may be coupled to receive an output voltage from CSA 260 (e.g., via RC filter 330a) and a selected voltage from MUX 348a. MUX 348a may receive a selected voltage from MUX 344e (e.g., that receives 20% of Vbus_in 120 and 20% of Vbus_c 130) and a selected voltage from MUX 340c (e.g., that receives 8% of Vbus_in 120 and 8% of Vbus_c 130).

Additional monitoring of Vbus_in 120 or Vbus_c 130 voltage levels to control power supply transitions (e.g., vsrc_new_p, vsrc_new_m) may be provided by comparators 250c_p and 250c_m. Comparators 250c_p and 250c_m may determine if the voltage has gone over a threshold voltage or reached a threshold voltage range.

Comparator 250c_p may be coupled to receive a corresponding reference voltage from the programmable reference generator and to receive a third selected voltage from MUX 240c_p. MUX 240c_p may receive a selected voltage from MUX 346a and an output voltage from CSA 260 (via RC filter 330b). MUX 346a may receive a selected voltage from MUX 344a (e.g., that receives 20% of Vbus_in 120 and 20% of Vbus_c 130) and a selected voltage from MUX 340a (e.g., that receives 8% of Vbus_in 120 and 8% of Vbus_c 130). Comparator 250c_p may be configured to output a voltage source (Vsrc) system interrupt based on determining that one or more of the Vbus_in 120 or the Vbus_c 130 meets a corresponding voltage condition (e.g., is within a corresponding range of values).

Comparator 250c_m may be coupled to receive a corresponding reference voltage from the programmable reference generator and to receive a selected voltage from MUX 240c_m. MUX 240c_m may receive a selected voltage from MUX 346b and an output voltage from CSA 260 (via RC filter 330b). MUX 346b may receive a selected voltage from MUX 344*b* (e.g., that receives 20% of Vbus_in 120 and 20% of Vbus_c 130) and a selected voltage from MUX 342*a* (e.g., that receives 10% of Vbus_in 120 and 10% of Vbus_c 130). Comparator 250*c_p* may be configured to output a Vsrc system interrupt based on determining that one or more of the Vbus_in 120 or the Vbus_c 130 meets a corresponding voltage condition (e.g., is within a corresponding range of values).

A substitute 1.2V reference may be routed to EA 310 based on 0.74V deep sleep reference or the 1.2V bandgap reference at MUX 350. EA 310 may be coupled to receive a selected output from MUX 350. MUX 350 may be coupled to receive a corresponding reference voltage from the programmable reference generator 230 and to receive a 1.2V bandgap reference (or 0.74V deep sleep reference).

Figure 4A:
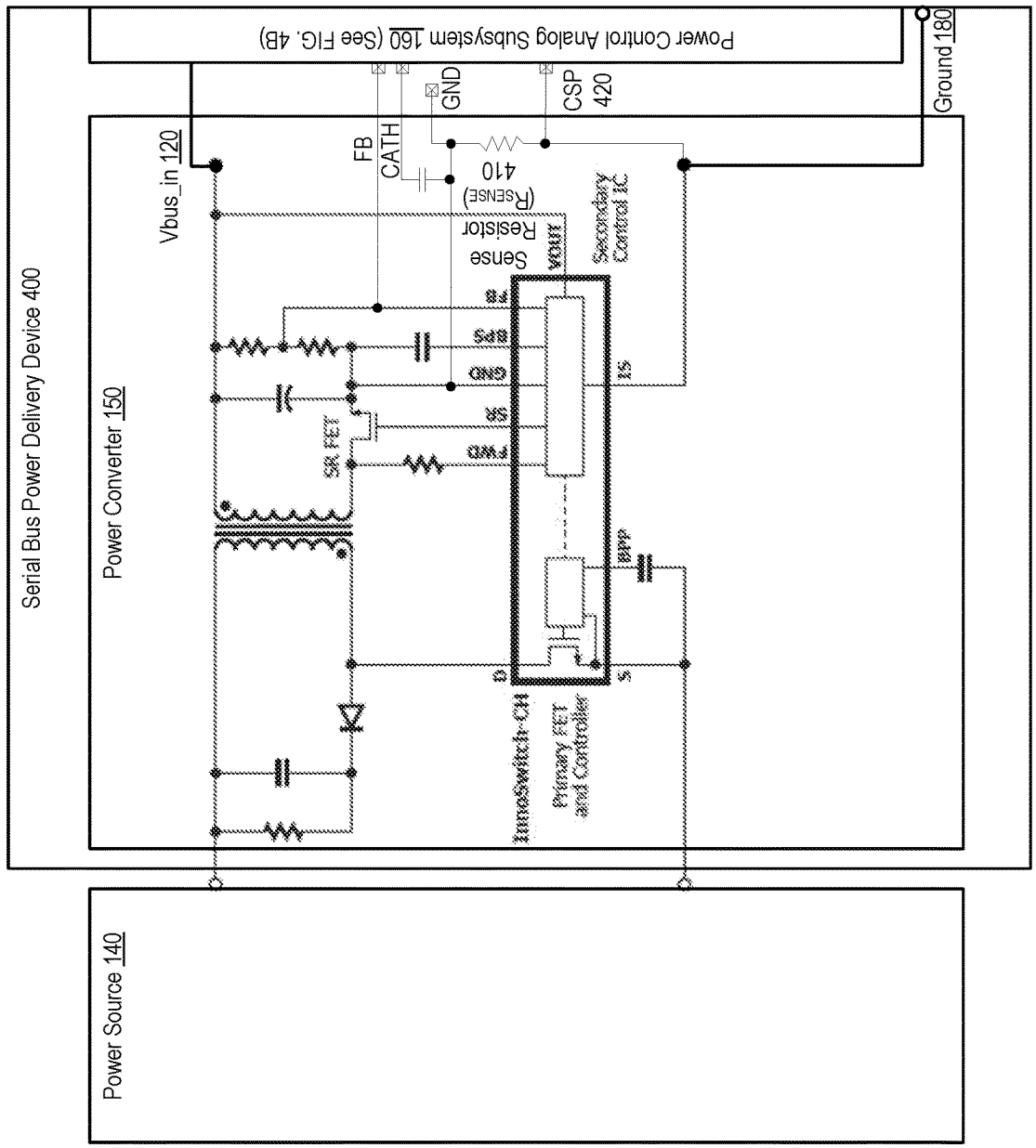
FIGS. 4A-4B is a circuit diagram illustrating the serial bus power delivery device, according to some embodiments.
Figure 4B:
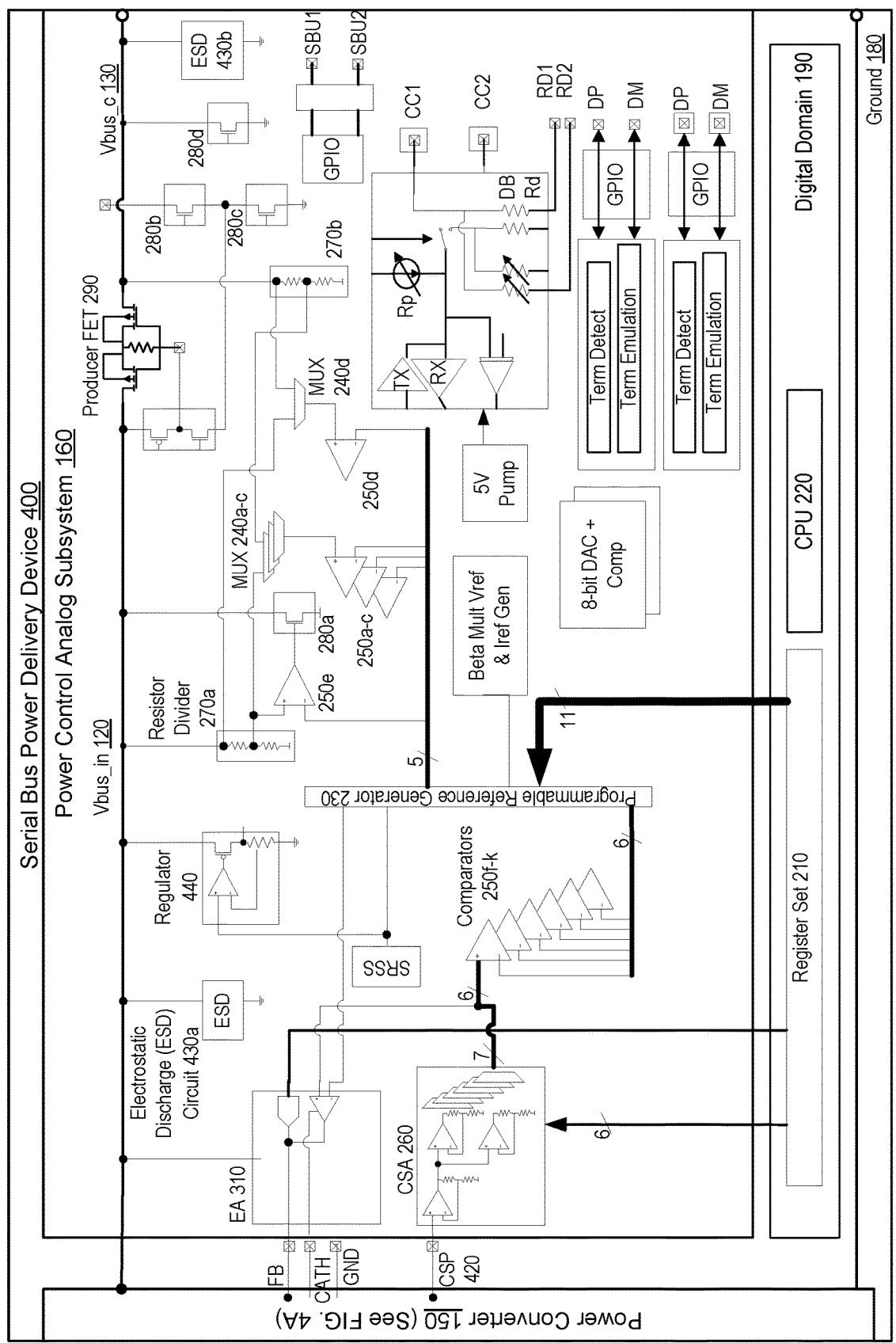

FIGS. 4A-4B is a circuit diagram illustrating the serial bus power delivery device 400, according to some embodiments. SBPD device 400 may include some similar components as SBPD device 110 and 200 as described with respect to FIGS. 1-2. For the sake of convenience and clarity, some components used in FIGS. 1-2 are used in the present Figures.

Conceptually, SBPD device 400 works similarly to SBPD device 110 and 200 of FIGS. 1-2.

The SBPD device 400 may include a power converter 150 and a power control analog subsystem 160. The power converter may be coupled to the power source 140.

The power converter 150 may provide the Vbus_in 120 to the power control analog subsystem. The power converter may have a sense resistor (Rsense) 410 that is to convert Vbus_in 130 into a CSA voltage (e.g., current sense positive (CSP) 420). CSP 420 may be a voltage that is smaller than Vbus_in 120 and is to be amplified by the CSA 260. The CSA 260 may be coupled to receive the CSP 420 from the Rsense 410 and to receive a set of register values (e.g., six register values) from the register set 210. The CSA 260 may output a set of output values (e.g., seven output values), a corresponding output value for each of comparators 250*f-k* and a corresponding output value for the EA 310.

The EA 310 may be coupled to receive a register value from the register set 210, to receive a corresponding reference voltage from the programmable reference generator 230, and Vbus_in 120. The EA 310 may output FB and CATH to the power converter 150.

The power control analog subsystem 160 may include one or more electrostatic discharge (ESD) circuits 430 (e.g., ESD 430*a-b*) coupled to the Vbus_in 120. The power control analog subsystem 160 may include one or more pull-down transistors 280 (e.g., pull down transistors 280*a-d*) coupled to the Vbus_in 120. The power control analog subsystem 160 may include a regulator 440 coupled to the Vbus_in 120. Regulator 440 may provide an internal power supply for the power control analog subsystem 160 (e.g., regulator 440 may provide 3-5V and Vbus_in 120 may be 3-20V).

Figure 5:
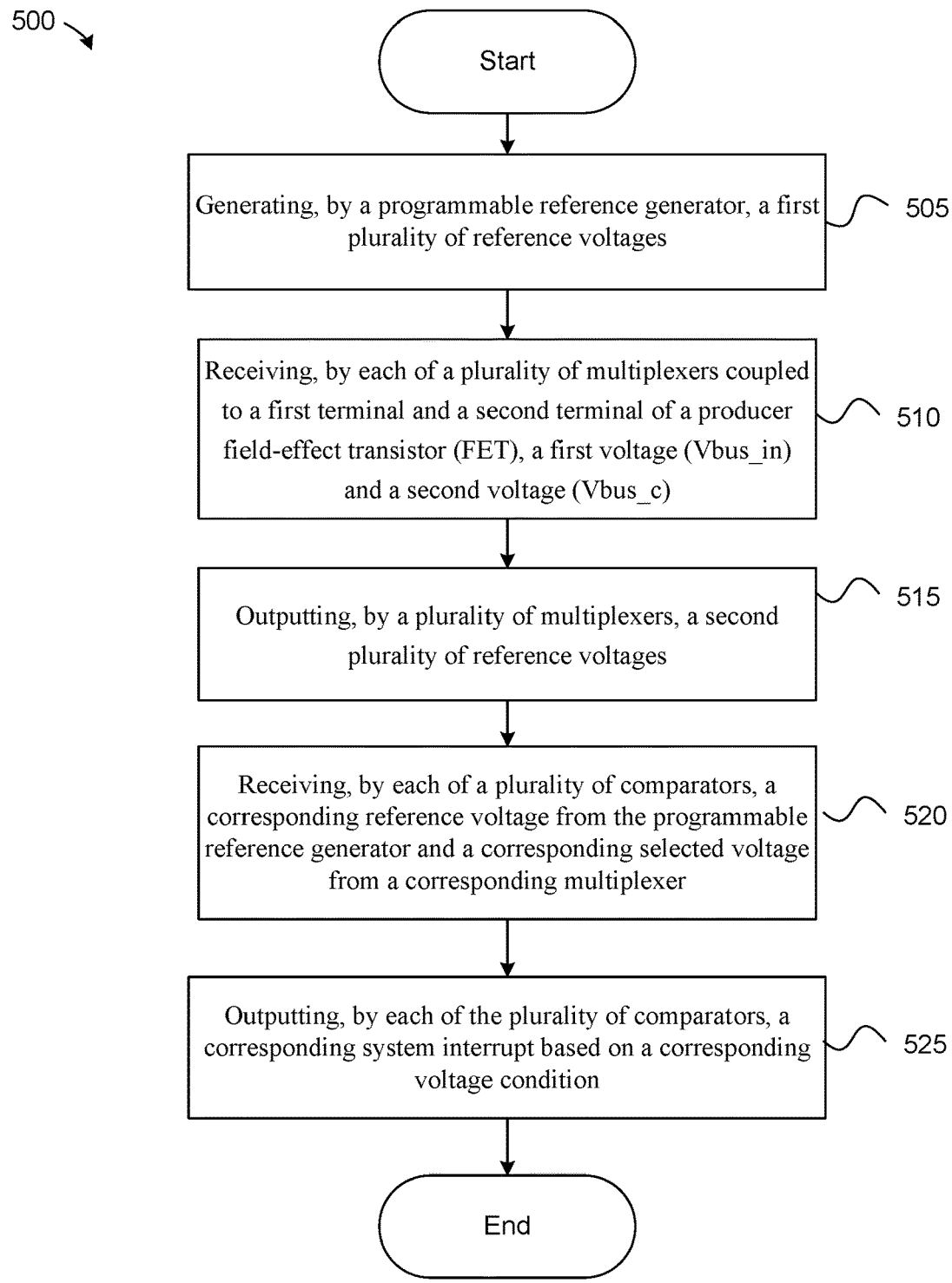
FIG. 5 illustrates a flow diagram of a method of providing multiple interrupt functions using a common programmable reference generator, according to another embodiment.

FIG. 5 illustrates a flow diagram of a method of providing multiple interrupt functions using a common programmable reference generator, according to another embodiment. The method 500 may be performed by processing logic that comprises hardware (e.g., circuitry, dedicated logic, programmable logic, microcode, etc.). In some embodiments, the method 500 is performed wholly or in part by SBPD device 110, 200. In some embodiments, the method 500 is performed by power control analog subsystem 160 or 300. In some embodiments, the method 500 is performed by the programmable reference generator 230, the multiplexers 240, and the comparators 250.

Method 500 begins at block 505 where processing logic performing the method generates, by a programmable reference generator 230, a first plurality of reference voltages. At block 510, processing logic receives, by each of a plurality of multiplexers coupled to a first terminal and a second terminal of producer FET 290, a first voltage (Vbus_in) and a second voltage (Vbus_c). At block 515, processing logic outputs, by a plurality of multiplexers (e.g., multiplexers 240*a-d*), a second plurality of reference voltages. At block 520, processing logic receives, by each of a plurality of comparators (e.g., comparators 250*a-d*), a corresponding reference voltage of the first plurality of reference voltages from the programmable reference generator 230, and a corresponding selected voltage of the second plurality of reference voltages from a corresponding multiplexer of the plurality of multiplexers (e.g., multiplexers 240*a-d*). At block 525, processing logic outputs, by each of the plurality of comparators (e.g., comparators 250*a-d*), a corresponding system interrupt based on a corresponding voltage condition.

In some embodiments, the method 500 is performed by the programmable reference generator 230, the multiplexers 240, and the comparators 250. At block 505, the programmable reference generator 230 generates a first plurality of reference voltages. At block 510 the multiplexers 240 (e.g., multiplexers 240*a-d*) output a second plurality of reference voltages. At block 515, each of a plurality of comparators 250 (e.g., comparators 250*a-d*) receives a corresponding reference voltage of the first plurality of reference voltages from the programmable reference generator 230 and a corresponding selected voltage of the second plurality of reference voltages from a corresponding multiplexer 240 of the plurality of multiplexers (e.g., multiplexers 240*a-d*). At block 520, each of the plurality of comparators 250 (e.g., comparators 250*a-d*) outputs a corresponding system interrupt based on a corresponding voltage condition.

Figure 6:
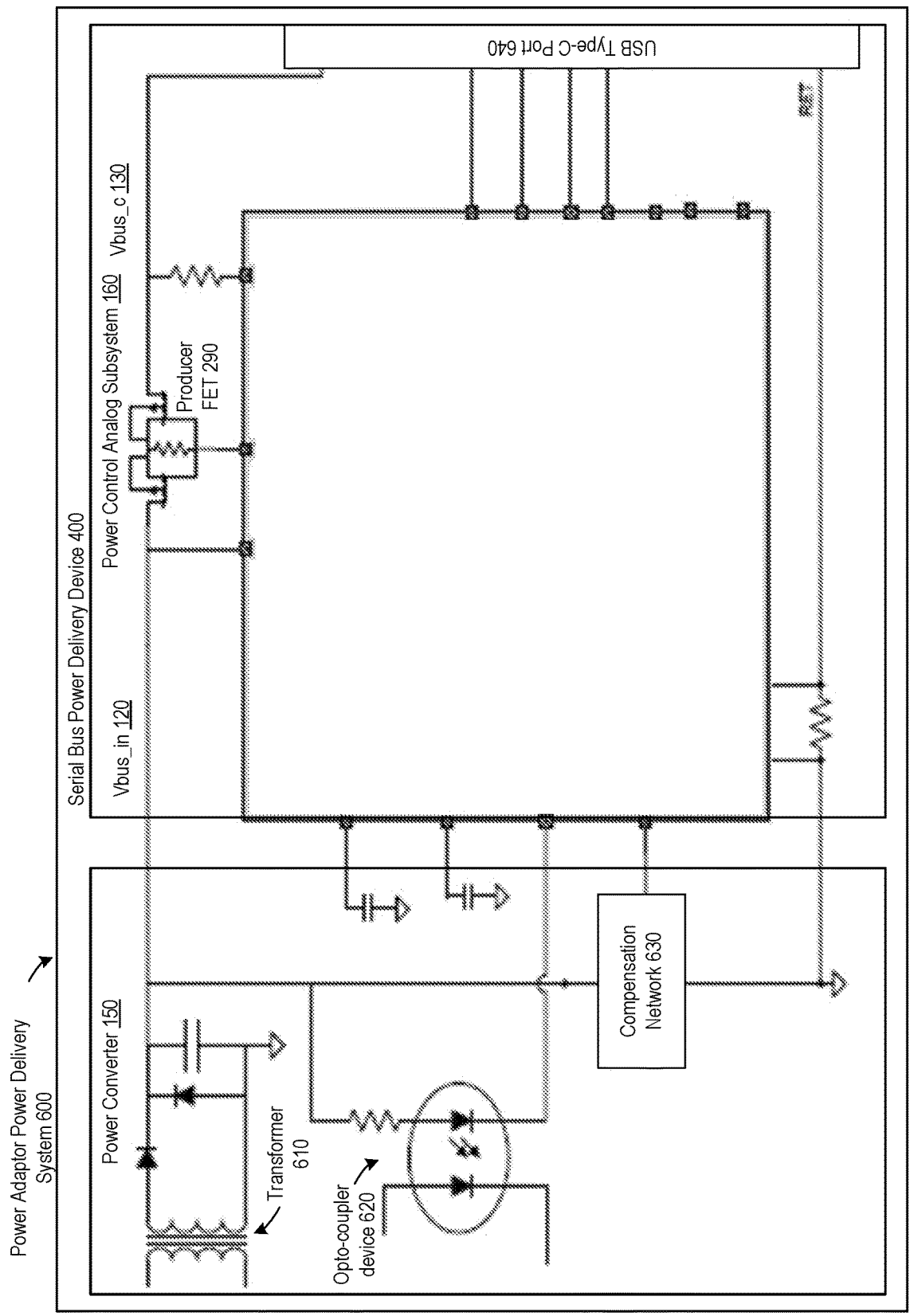
FIG. 6 is a circuit diagram illustrating a power adaptor power delivery system, according to some embodiments.

FIG. 6 is a circuit diagram illustrating a power adaptor power delivery system 600, according to some embodiments. The power converter may include a transformer 610, an opto-coupler device 620, and a compensation network 630. The power control analog subsystem 160 may include a USB Type-C™ Port 640. The power control analog subsystem 160 may control a power adapter (e.g., the power control analog subsystem 160 may control the source DC voltage by sending a feedback signal via an opto-coupler device 620 to a primary transformer control (not shown). Voltages on boths sides of the Producer FET 290 (e.g., Vbus_in 120 and Vbus_c 130) may be monitored for state of the voltages to determine appropriate control modes. In some embodiments, the power control analog subsystem 160 includes the producer FET 290. In some embodiments, the producer FET 290 is external to the power control analog subsystem 160. The power control analog subsystem 160 may include a CSA 260 and the CSA 260 may be used to monitor the current drawn by any device connected to the USB Type-C™ port 640 (e.g., the Type-C connector).

Figure 7:
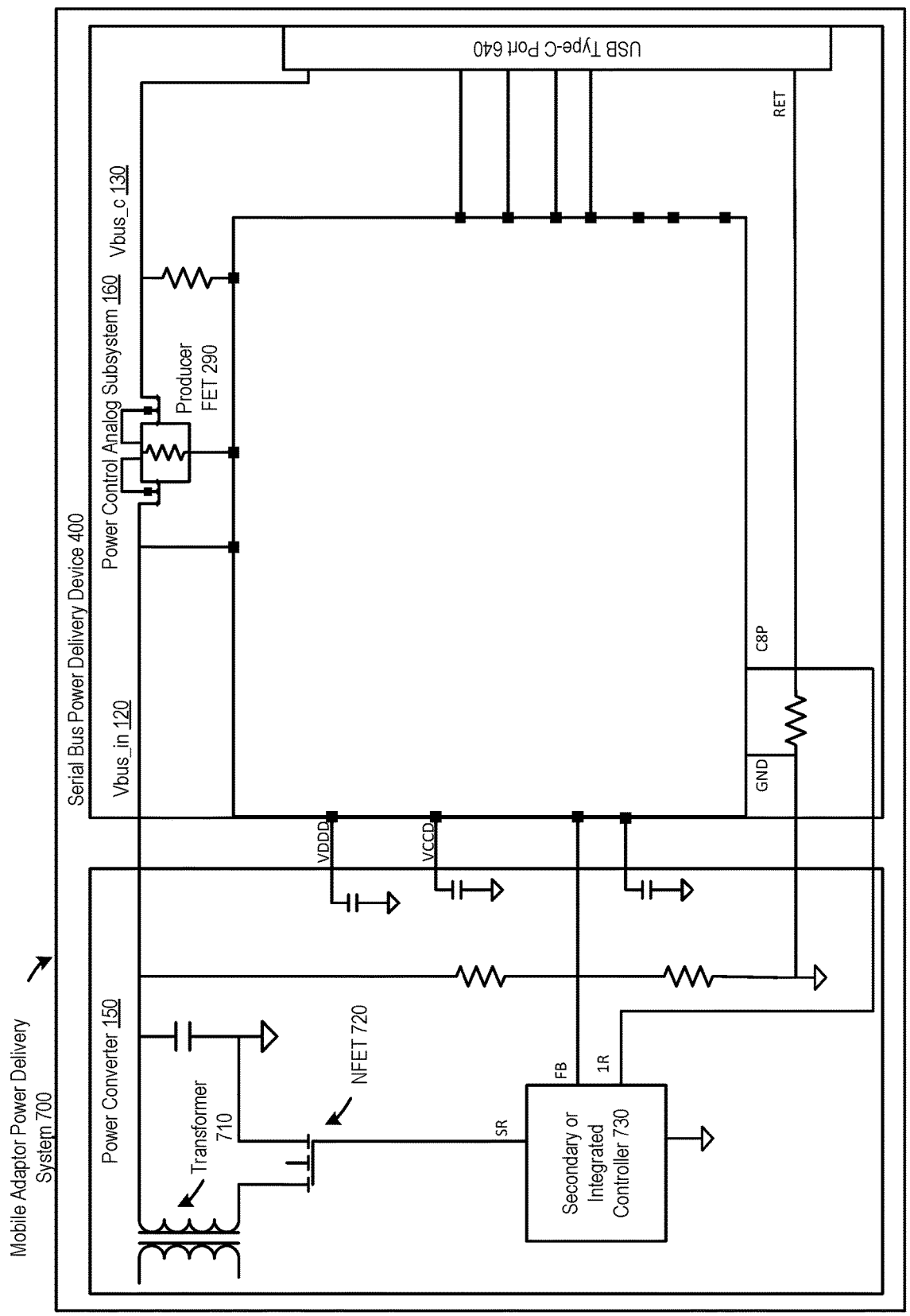
FIG. 7 is a circuit diagram illustrating a mobile adaptor power delivery system, according to some embodiments.

FIG. 7 is a circuit diagram illustrating a mobile adaptor power delivery system 700, according to some embodiments. The mobile adaptor power delivery system 700 may include direct feedback control. An external integrated circuit (IC) (e.g., power control analog subsystem 160) may be used to control a primary side of the transformer 710 (e.g., adapter transformer). The external IC may have the ability to control a synchronous recitfication (SR) mechanism shown by the NFET 720 (e.g., n-type JFET transistor, junction field effect transistor of n-type) connected to a secondary winding of the transformer 710 (e.g., that replaces the diodes shown in FIG. 6).

Figure 8:
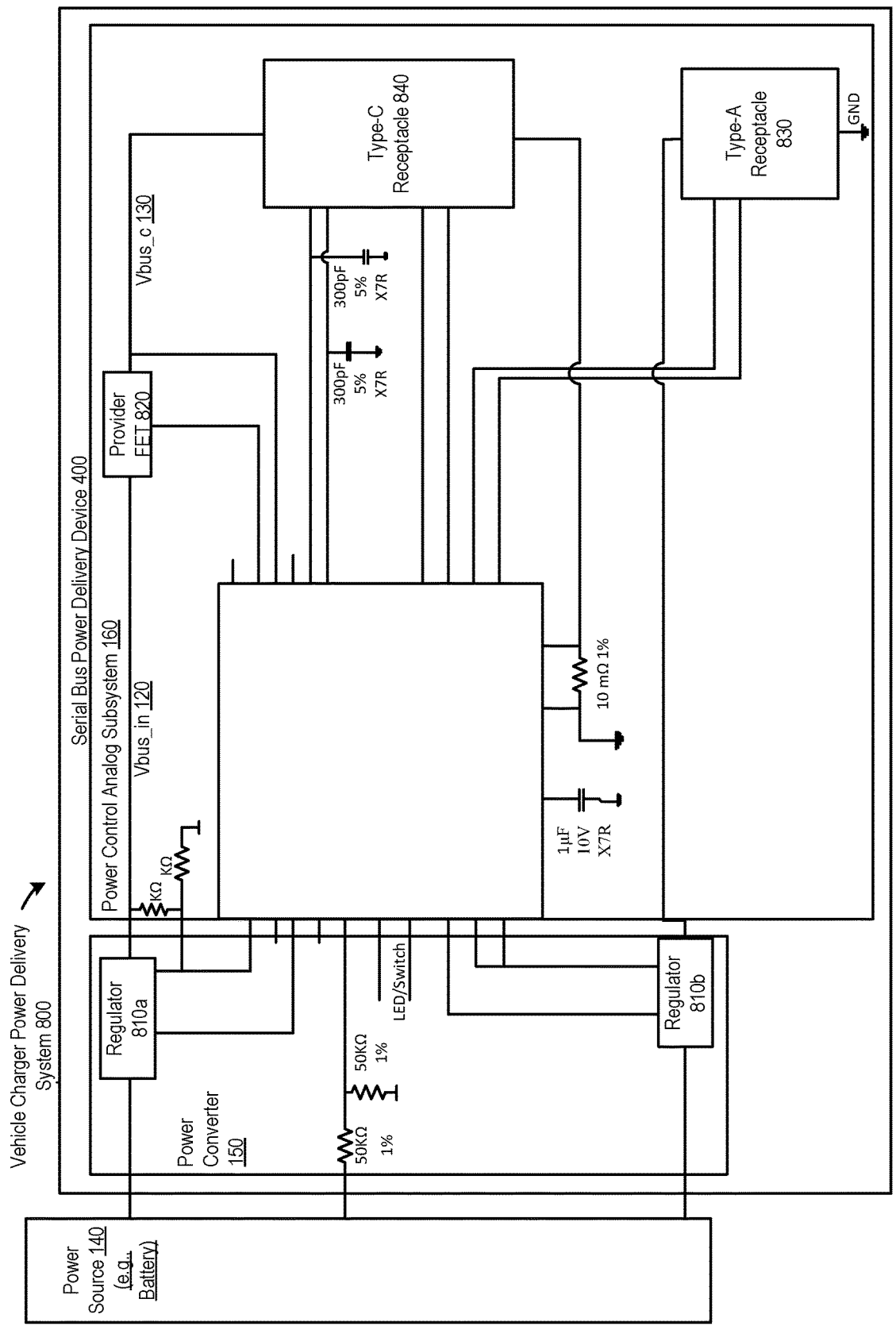
FIG. 8 is a circuit diagram illustrating a vehicle charger power delivery system, according to some embodiments.

FIG. 8 is a circuit diagram illustrating a vehicle charger power delivery system 800, according to some embodiments. In some embodiments, the vehicle charger power delivery system 800 is a Type-C/Type-A vehicle charger. The vehicle charger power delivery system 800 may include a power converter 150 and a power control analog subsystem 160. The power converter 150 may include a regulator 810*a* and a regulator 810*b* that are coupled to the power source 140 and to the power control analog subsystem 160. The power control analog subsystem 160 may include a provider FET 820, a Type-A receptacle 830, and a type-C receptacle 840. In some embodiments, the power control analog subsystem 160 includes the provider FET 820. In some embodiments, the provider FET 820 is external to the power control analog subsystem 160. The serial bus power delivery device 400 may acts as a power controller when connected to a battery source (e.g., power source 140) (e.g., instead of an adapter). The power source 140 provides power that can be drawn by a Type-C sink device (e.g., sink device 170) via Type-C receptacle 840.

Figure 9A:
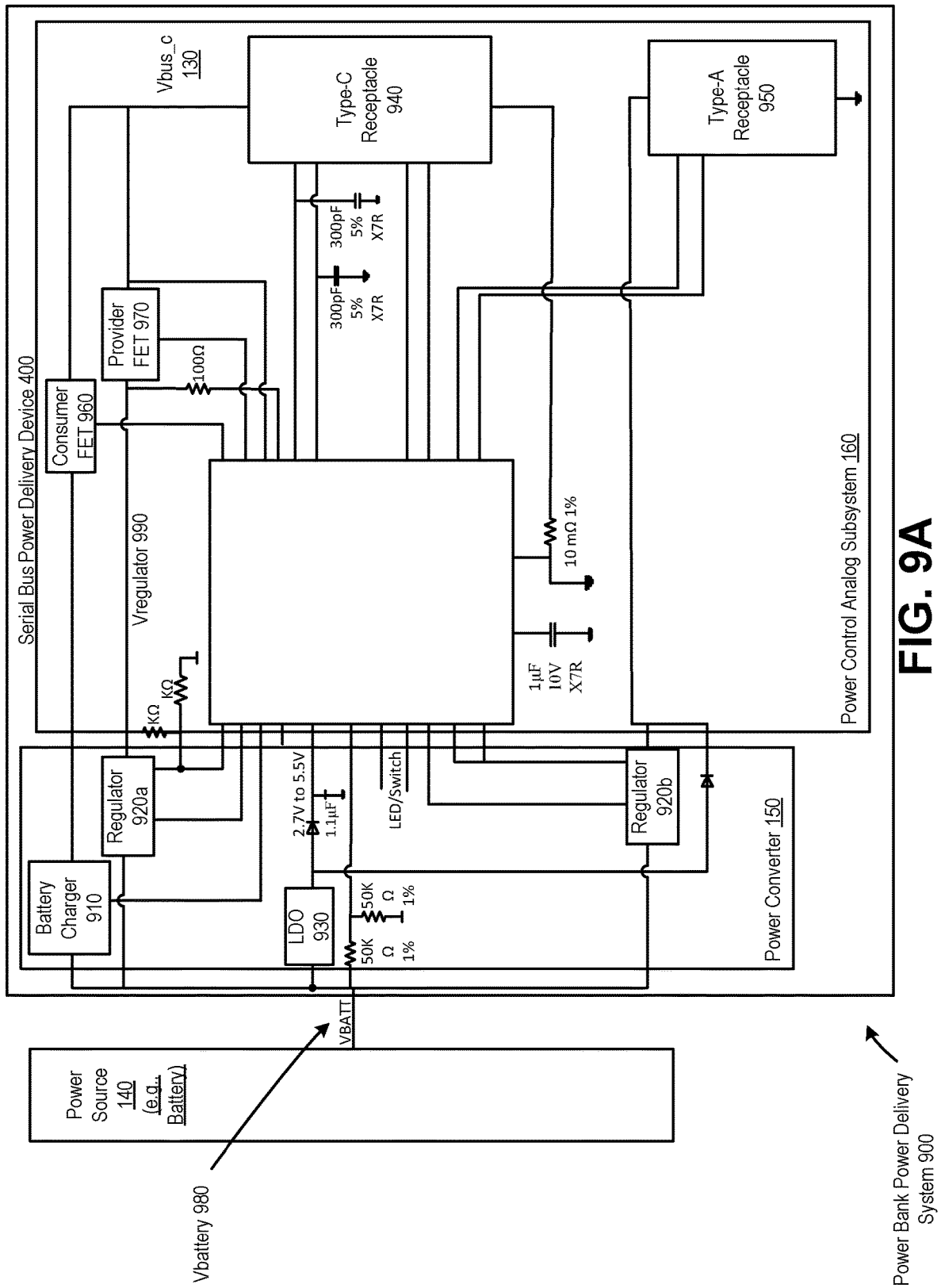
FIG. 9A is a circuit diagram illustrating a power bank power delivery system, according to some embodiments.

FIG. 9A is a circuit diagram illustrating a power bank power delivery system 900, according to some embodiments. The power bank power delivery system 900 may include a power source 140 (e.g., battery), a power converter 150, and a power control analog subsystem 160. The power source 140 may provide a battery voltage (e.g., Vbattery 980). The power converter 150 may include a battery charger 910, a regulator 920*a*, and a regulator 920*b*. In some embodiments, the power converter 150 includes a low-dropout linear regulator (LDO) 930. The power control analog subsystem 160 may include a Type-C receptacle 940, a Type-A receptacle 950, a consumer FET 960, and a provider FET 970. In some embodiments, the power control analog subsystem 160 includes consumer FET 960 and/or the provider FET 970. In some embodiments, the consumer FET 960 and/or the provider FET 970 is external to the power control analog subsystem 160.

The power bank power delivery system 900 illustrates how the power control analog subsystem 160 can be positioned on either side of the Type-C cable. The power bank power delivery system 900 may monitor the power supply states. In response to being positioned on the "sink" side of the cable, the power source 140 (e.g., battery) can be charged. In response to being positioned on the "source" side of the cable, the power source 140 (e.g., battery) can supply power.

Figure 9B:
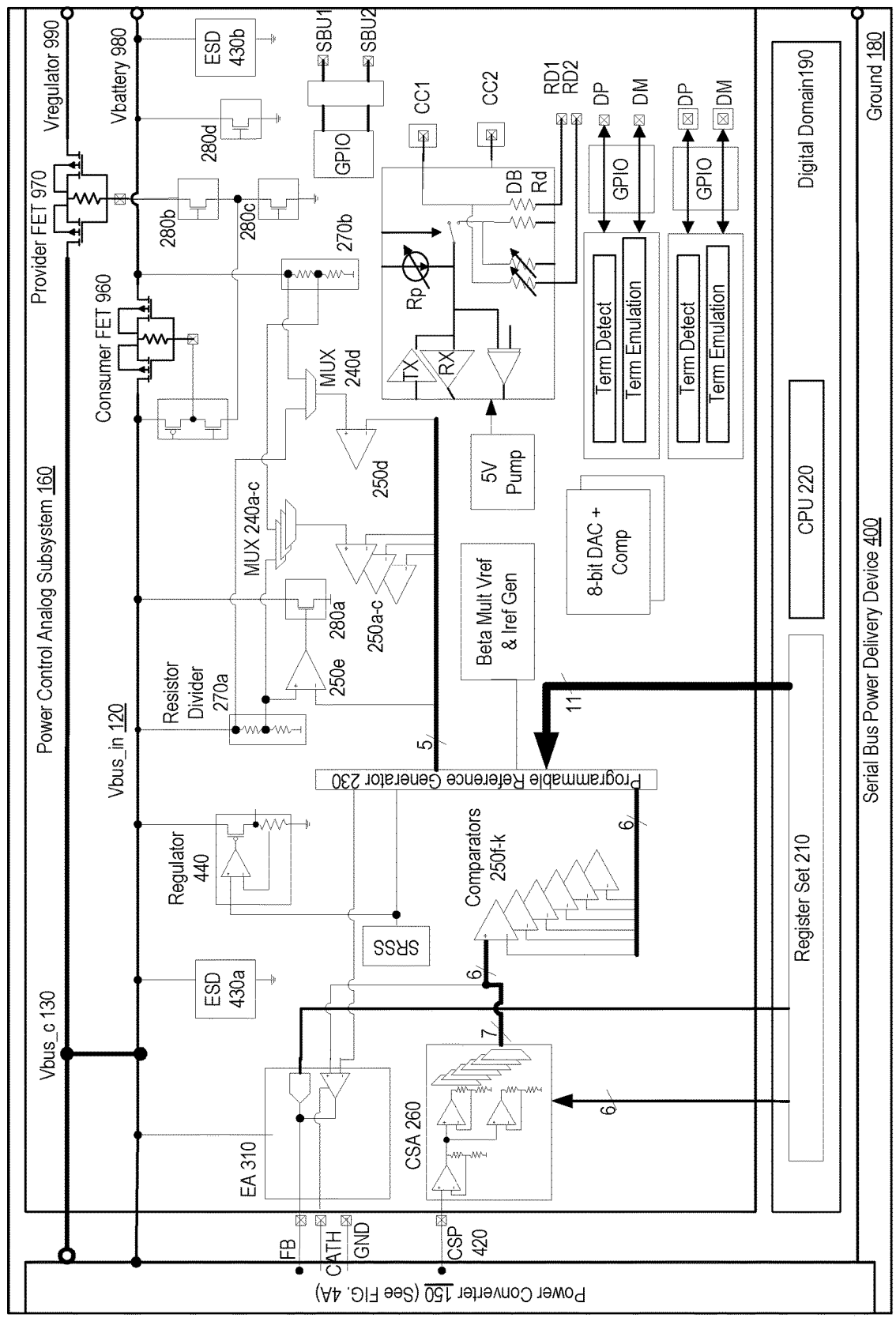
FIG. 9B is a circuit diagram illustrating a power bank power delivery system, according to some embodiments.

FIG. 9B is a circuit diagram illustrating a power bank power delivery system 900, according to some embodiments. FIG. 9B illustrates power control analog subsystem 160 including Vbus_in 120, Vbus_c 130, Vbattery 980, and Vregulator 990. The power control analog subsystem 160 also includes consumer FET 960 and provider FET 970. In some embodiments, the power control analog subsystem 160 includes consumer FET 960 and/or the provider FET 970. In some embodiments, the consumer FET 960 and/or the provider FET 970 is external to the power control analog subsystem 160.

Figure 10:
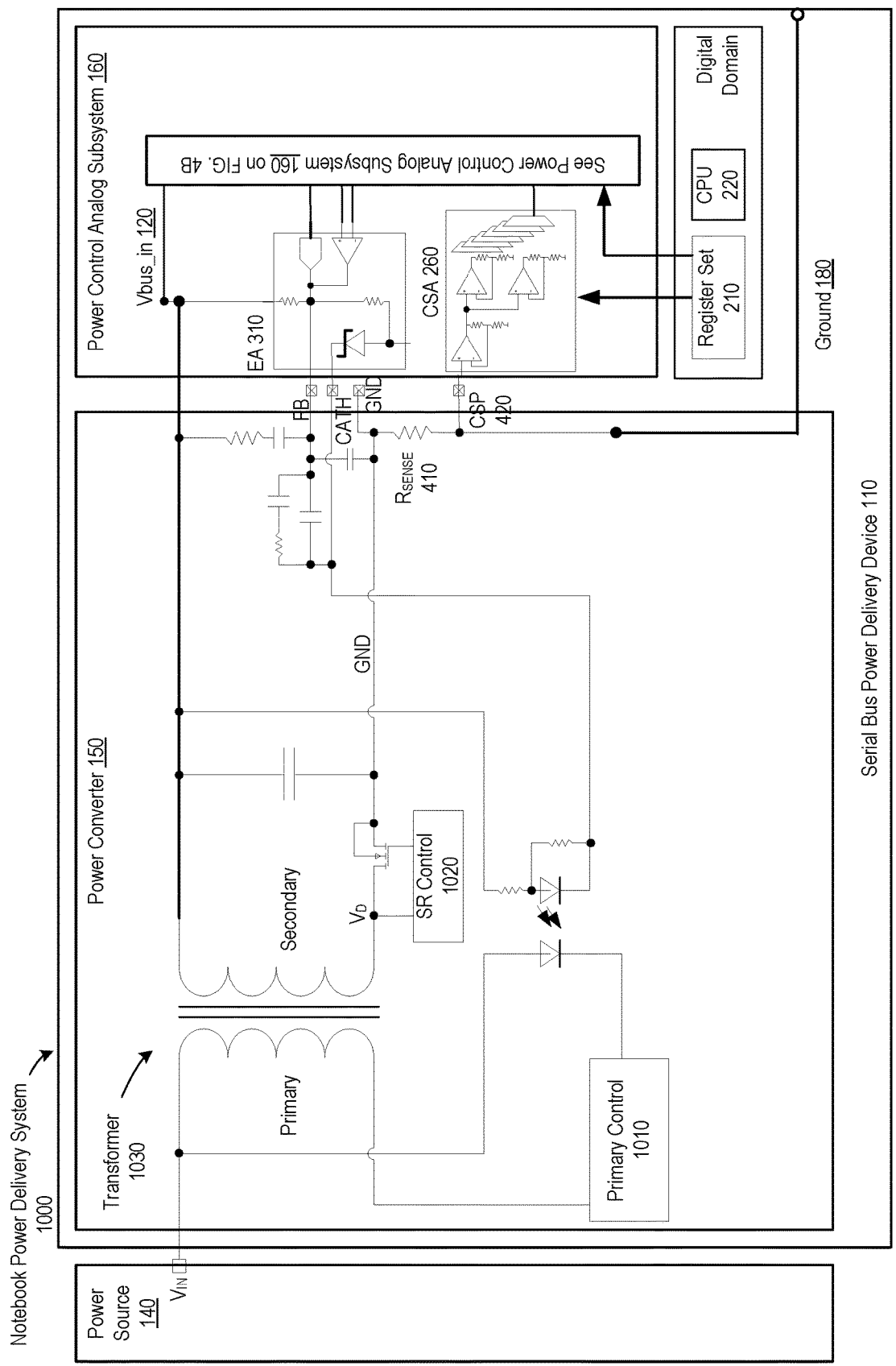
FIG. 10 is a circuit diagram illustrating a notebook power delivery system, according to some embodiments.

FIG. 10 is a circuit diagram illustrating a notebook power delivery system 1000, according to some embodiments. The notebook power delivery system 1000 may include a power source 140 and a SBPD device 110. The SBPD device 110 may include a power converter 150, a power control analog subsystem 160, and a digital domain 190. The power converter 150 may include a transformer 1030, a primary control 1010, and a SR control 1020 (e.g., secondary control).

In the above description, numerous details are set forth. It will be apparent, however, to one of ordinary skill in the art having the benefit of this disclosure, that embodiments of the present disclosure may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving," "adjusting," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an embodiment" or "one embodiment" throughout is not intended to mean the same embodiment or embodiment unless described as such.

Embodiments descried herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth above are merely exemplary. Particular embodiments may vary from these exemplary details and still be contemplated to be within the scope of the present disclosure.

It is to be understood that the above description is intended to be illustrative and not restrictive. Many other embodiments will be apparent to those of skill in the art upon reading and understanding the above description. The scope of the disclosure should, therefore, be determined with reference to the appended claims, along with the full scope of equivalents to which such claims are entitled.

In the above description, for purposes of explanation, numerous specific details are set forth in order to provide a thorough understanding of the present disclosure. It will be evident, however, to one skilled in the art that the present disclosure may be practiced without these specific details. In other instances, well-known circuits, structures, and techniques are not shown in detail, but rather in a block diagram in order to avoid unnecessarily obscuring an understanding of this description.

Reference in the description to "one embodiment" or "an embodiment" means that a particular feature, structure, or characteristic described in connection with the embodiment is included in at least one embodiment of the disclosure. The phrase "in one embodiment" located in various places in this description does not necessarily refer to the same embodiment.

What is claimed is:

1. A device comprising:
    a power control analog subsystem of a universal serial bus (USB) compatible power supply device, the power control analog subsystem comprising:
        a programmable reference generator to generate a first plurality of reference voltages for multiple functions;
        a first voltage level adjustment circuit coupled to a first terminal of a producer field-effect transistor (FET) to receive a first voltage (Vbus_in);
        a second voltage level adjustment circuit coupled to a second terminal of the producer FET to receive a second voltage (Vbus_c);
        a plurality of multiplexers to output a second plurality of reference voltages, wherein each of the plurality of multiplexers is coupled to the first voltage level adjustment circuit to receive a corresponding first value of the Vbus_in and is coupled to the second voltage level adjustment circuit to receive a corresponding second value of the Vbus_c; and
        a plurality of comparators, wherein each of the plurality of comparators is coupled to receive a corresponding reference voltage of the first plurality of reference voltages from the programmable reference generator and to receive a corresponding selected voltage of the second plurality of reference voltages from a corresponding multiplexer of the plurality of multiplexers based on the corresponding first value of the Vbus_in and the corresponding second value of the Vbus_c, wherein each of the plurality of comparators is configured to output a corresponding system interrupt based on a corresponding voltage condition for a corresponding function of the multiple functions.

2. The device of claim 1, wherein the corresponding first value of the Vbus_in from the first voltage level adjustment circuit is a corresponding first percentage of the Vbus_in and the corresponding second value of the Vbus_c from the second voltage level adjustment circuit is a corresponding second percentage of the Vbus_c.

3. The device of claim 1, wherein a first comparator of the plurality of comparators is coupled to receive a first reference voltage of the first plurality of reference voltages from the programmable reference generator and to receive a first selected voltage of the second plurality of reference voltages from a first multiplexer of the plurality of multiplexers, wherein the first comparator is configured to output an under-voltage (UV) system interrupt based on determining that one or more of the Vbus_in or the Vbus_c is less than a first minimum threshold voltage.

4. The device of claim 1, wherein the corresponding system interrupt comprises one or more of an under-voltage (UV) system interrupt, an over-voltage (OV) system interrupt, a voltage source system interrupt, or a Vbus monitor system interrupt.

5. The device of claim 4, wherein a second comparator of the plurality of comparators is coupled to receive a second reference voltage of the first plurality of reference voltages from the programmable reference generator and to receive a second selected voltage of the second plurality of reference voltages from a second multiplexer of the plurality of multiplexers, wherein the second comparator is configured to output the OV system interrupt based on determining that one or more of the Vbus_in or the Vbus_c is greater than a second maximum threshold voltage.

6. The device of claim 4, wherein a third comparator of the plurality of comparators is coupled to receive a third reference voltage of the first plurality of reference voltages from the programmable reference generator and to receive a third selected voltage of the second plurality of reference voltages from a third multiplexer of the plurality of multiplexers, wherein the third comparator is configured to output the Vbus monitor system interrupt based on the corresponding voltage condition determining that one or more of the Vbus_in or the Vbus_c meets the corresponding voltage condition.

7. The device of claim 4, wherein the power control analog subsystem further comprises a fourth comparator, wherein the fourth comparator is coupled to receive a fourth reference voltage of the first plurality of reference voltages from the programmable reference generator and to receive the Vbus_in from the first voltage level adjustment circuit, wherein the fourth comparator is configured to output a fourth system interrupt to cause discharge of the Vbus_in based on determining that the Vbus_in meets the corresponding voltage condition.

8. The device of claim 4, wherein the power control analog subsystem further comprises a fifth comparator and a fifth multiplexer, wherein the fifth comparator is coupled to receive a fifth reference voltage of the first plurality of reference voltages from the programmable reference generator and to receive a fifth output voltage from a current sense amplifier (CSA), wherein the fifth comparator is configured to output a short circuit protection (SCP) system interrupt based on determining that the fifth output voltage meets the corresponding voltage condition.

9. The device of claim 4, wherein the power control analog subsystem comprises a sixth comparator and a sixth multiplexer, wherein the sixth comparator is coupled to receive a sixth reference voltage of the plurality of reference voltages from the programmable reference generator and is to receive a sixth output voltage from a current sense amplifier (CSA), wherein the sixth comparator is configured to output an over current protection (OCP) system interrupt based on determining that the sixth output voltage meets the corresponding voltage condition.

10. The device of claim 4, wherein the power control analog subsystem comprises a seventh comparator and a seventh multiplexer, wherein the seventh comparator is coupled to receive a seventh reference voltage of the plurality of reference voltages from the programmable reference generator and is to receive a seventh output voltage from a current sense amplifier (CSA), wherein the seventh comparator is configured to output a power factor correction (PFC) system interrupt based on determining that the seventh output meets the corresponding voltage condition.

11. The device of claim 4, wherein an eighth comparator of the plurality of comparators is coupled to receive an eighth reference voltage of the first plurality of reference voltages from the programmable reference generator and to receive an eighth selected voltage of the second plurality of reference voltages from an eighth multiplexer of the plurality of multiplexers, wherein the eighth comparator is configured to output the voltage source system interrupt based on determining that one or more of the Vbus_in or the Vbus_c meets the corresponding voltage condition.

12. The device of claim 4, wherein the power control analog subsystem comprises a ninth comparator and a ninth multiplexer, wherein the ninth comparator is coupled to receive a ninth reference voltage of the plurality of reference voltages from the programmable reference generator and is to receive a ninth output voltage from a current sense amplifier (CSA), wherein the ninth comparator is configured to output a synchronous rectification (SR) system interrupt based on determining that the ninth output voltage meets the corresponding voltage condition.

13. A universal serial bus (USB) compatible power supply device, comprising:
 a register set to store register values to program a first reference voltage and a second reference voltage;
 a central processing unit (CPU) coupled to the register set, the CPU to store the register values in the register set, wherein the CPU comprises a first input to receive a first system interrupt and a second input to receive a second system interrupt; and
 a power control analog subsystem coupled to the CPU and the register set, wherein the power control analog subsystem comprises:
 a programmable reference generator to generate the first reference voltage and the second reference voltage in response to the register values for multiple functions;
 a first multiplexer coupled to a first voltage level adjustment circuit to receive a first value of a first voltage (Vbus_in) and coupled to a second voltage level adjustment circuit to receive a second value of a second voltage (Vbus_c), the first multiplexer to output a first selected voltage based on the first value of Vbus_in and the second value of Vbus_c;
 a second multiplexer coupled to the first voltage level adjustment circuit to receive a third value of the Vbus_in and coupled to the second voltage level adjustment circuit to receive a fourth value of the Vbus_c, the second multiplexer to output a second selected voltage based on the third value of Vbus_in and the fourth value of Vbus_c;
 a first comparator coupled to receive the first reference voltage from the programmable reference generator and to receive the first selected voltage from the first multiplexer, wherein the first comparator is configured to output the first system interrupt to the CPU based on a first voltage condition for a first function of the multiple functions; and
 a second comparator coupled to receive the second reference voltage from the programmable reference generator and to receive the second selected voltage from the second multiplexer, wherein the second comparator is configured to output the second system interrupt to the CPU based on a second voltage condition that is different from the first voltage condition for a second function of the multiple functions.

14. The USB compatible power supply device of claim 13, wherein the first voltage level adjustment circuit is coupled to a first terminal of a producer field-effect transistor (FET) to receive the Vbus_in and the second voltage level adjustment circuit is coupled to a second terminal of the producer FET to receive the Vbus_c.

15. The USB compatible power supply device of claim 13, wherein the first reference voltage is indicative of a first programmable threshold for the first function, wherein the second reference voltage is indicative of a second programmable threshold for the second function that is different from the first function, wherein the first function and the second function are selected from a group consisting of UV detection, OV detection, monitoring of the Vbus_in and the Vbus_c, and monitoring of a voltage source of the USB compatible power supply device.

16. The USB compatible power supply device of claim 13, wherein the first system interrupt and the second system interrupt are selected from a group consisting of an under-voltage (UV) system interrupt, an over-voltage (OV) system interrupt, a voltage source system interrupt, and a Vbus monitor system interrupt.

17. The USB compatible power supply device of claim 13, wherein the register values are further to program a third reference voltage and a fourth reference voltage, wherein the programmable reference generator is to generate the third reference voltage and the fourth reference voltage in response to the register values, wherein the CPU comprises a third input to receive a third system interrupt and a fourth input to receive a fourth system interrupt, wherein the power control analog subsystem further comprises:
 a current sense amplifier (CSA) to output a third output voltage and a fourth output voltage;
 a third comparator coupled to receive the third reference voltage from the programmable reference generator and to receive the third output voltage from the CSA, wherein the third comparator is configured to output the third system interrupt to the CPU based on a third voltage condition; and
 a fourth comparator coupled to receive the fourth reference voltage from the programmable reference generator and to receive the fourth output voltage from the CSA, wherein the fourth comparator is configured to output the fourth system interrupt to the CPU based on a fourth voltage condition.

18. The USB compatible power supply device of claim 17, wherein the register values are further to program a fifth reference voltage, wherein the programmable reference generator is to generate the fifth reference voltage in response to the register values, wherein the power control analog subsystem further comprises:
 a pull-down transistor; and
 a fifth comparator coupled to receive the fifth reference voltage from the programmable reference generator and to receive the Vbus_in from the first voltage level adjustment circuit, wherein the fifth comparator is configured to cause the pull-down transistor to discharge the Vbus_in based on a fifth voltage condition.

19. A method comprising:
 comparing, by each of a plurality of comparators of a power control analog subsystem, a corresponding reference voltage of a first plurality of reference voltages for multiple functions from a programmable reference generator and a corresponding selected voltage of a second plurality of reference voltages from a corresponding multiplexer of a plurality of multiplexers each coupled to a first voltage (Vbus_in) and coupled to a second voltage (Vbus_c) based on a corresponding first value of the Vbus_in and a corresponding second value of the Vbus_c;
 outputting, by each of the plurality of comparators, a corresponding system interrupt based on a corresponding voltage condition for a corresponding function of the multiple functions;
 receiving, by the first voltage level adjustment circuit of the power control analog subsystem, the Vbus_in from a producer field-effect transistor (FET);
 receiving, by the second voltage level adjustment circuit of the power control analog subsystem, the Vbus_c from the producer FET;
 outputting, by the first voltage level adjustment circuit, corresponding first values of the Vbus_in, wherein each of the corresponding first values of the Vbus_in is a corresponding first percentage of the Vbus_in; and
 outputting, by the second voltage level adjustment circuit, corresponding second values of the Vbus_c, wherein each of the corresponding second values of the Vbus_c is a corresponding second percentage of the Vbus_in.

20. The method of claim 19, wherein the corresponding system interrupt comprises one or more of an under-voltage (UV) system interrupt, an over-voltage (OV) system interrupt, a voltage source system interrupt, or a Vbus monitor system interrupt.

21. The method of claim 19, wherein each of the first plurality of reference voltages is indicative of a corresponding threshold for the corresponding function selected from a group consisting of UV detection, OV detection, monitoring of the Vbus_in and the Vbus_c, and monitoring of a voltage source of the USB compatible power supply device.

22. The method of claim 19 further comprising:
 outputting, by a current sense amplifier (CSA) of the power control analog subsystem, a third plurality of reference voltages;
 receiving, by each of a second plurality of comparators of the power control analog subsystem, the corresponding reference voltage of the first plurality of reference voltages from the programmable reference generator and a corresponding output voltage of the third plurality of reference voltages from the CSA; and
 outputting, by each of the second plurality of comparators, the corresponding system interrupt based on the corresponding voltage condition.

* * * * *